United States Patent
Murakami et al.

(10) Patent No.: US 9,489,715 B2
(45) Date of Patent: Nov. 8, 2016

(54) IMAGE DISPLAY APPARATUS AND IMAGE DISPLAY METHOD

(71) Applicant: OMRON Corporation, Kyoto-shi, Kyoto (JP)

(72) Inventors: Tatsuya Murakami, Kusatsu (JP); Atsushi Irie, Nara (JP); Masahiro Senga, Otsu (JP); Mizuki Furuta, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 14/613,797

(22) Filed: Feb. 4, 2015

(65) Prior Publication Data
US 2015/0262330 A1     Sep. 17, 2015

(30) Foreign Application Priority Data
Mar. 11, 2014   (JP) .................. 2014-047341

(51) Int. Cl.
| G06T 3/40 | (2006.01) |
| G06F 3/0484 | (2013.01) |
| G06F 3/0481 | (2013.01) |
| G06F 3/147 | (2006.01) |
| G06F 3/0483 | (2013.01) |
| G06F 3/0488 | (2013.01) |

(52) U.S. Cl.
CPC .............. *G06T 3/40* (2013.01); *G06F 3/0481* (2013.01); *G06F 3/0483* (2013.01); *G06F 3/04842* (2013.01); *G06F 3/04883* (2013.01); *G06F 3/147* (2013.01); *G06F 2203/04806* (2013.01); *G06T 2207/30201* (2013.01); *G09G 2340/045* (2013.01); *G09G 2354/00* (2013.01)

(58) Field of Classification Search
None
See application file for complete search history.

(56) References Cited

U.S. PATENT DOCUMENTS

| 7,852,356 | B2* | 12/2010 | Takikawa .................. G06T 3/40 345/660 |
| 8,885,069 | B2* | 11/2014 | Kunishige .............. H04N 5/232 348/240.1 |
| 2010/0214321 | A1* | 8/2010 | Hokkanen .......... H04N 1/00336 345/660 |
| 2011/0109581 | A1* | 5/2011 | Ozawa .................. G06F 3/0481 345/173 |

(Continued)

FOREIGN PATENT DOCUMENTS

| JP | 2004-193933 A | 7/2004 |
| JP | 2006-178222 A | 7/2006 |

(Continued)

OTHER PUBLICATIONS

Extended Eurpoean Search Report in counterpart European Application # 15153006.0 issued Apr. 7, 2015 (8 pages).

(Continued)

*Primary Examiner* — Chante Harrison
(74) *Attorney, Agent, or Firm* — Osha Liang LLP (57) ABSTRACT

An image display apparatus includes: a display screen; an image output unit configured to output an image to the display screen; a region setting unit configured to extract one or more objects included in the image and to set a first region, which is a region corresponding to each of the objects; an operation acquisition unit configured to acquire a coordinate on the display screen that has been designated by a user; and an image zooming unit configured to zoom in the image, which is being displayed, on the basis of the designated coordinate. The image zooming unit zooms in the object included in the first region when the designated coordinate is within the first region.

9 Claims, 8 Drawing Sheets

(56) References Cited

U.S. PATENT DOCUMENTS

| | | | |
|---|---|---|---|
| 2013/0016255 A1* | 1/2013 | Bhatt | G06T 11/60 348/240.2 |
| 2013/0076945 A1* | 3/2013 | Nagata | H04N 5/23296 348/240.2 |
| 2013/0235086 A1* | 9/2013 | Otake | H04N 5/23293 345/660 |
| 2014/0267436 A1* | 9/2014 | Schulz | G06T 11/60 345/660 |

FOREIGN PATENT DOCUMENTS

| | | |
|---|---|---|
| JP | 2013-142919 A | 7/2013 |
| WO | 2013/103036 A1 | 7/2013 |

OTHER PUBLICATIONS

Office Action in counterpart Korean Patent Application No. 10-2015-0012585 issued Feb. 2, 2016 (9 pages).

* cited by examiner

IMAGE DISPLAY APPARATUS AND IMAGE DISPLAY METHOD

BACKGROUND OF THE INVENTION

1. Field of the Invention

The present invention relates to an image display apparatus that displays images.

2. Description of the Related Art

Computers, such as smartphones and tablets, which are operated by touching a screen have recently gained popularity. Where an image, for example a photo, is displayed using such a computer, the image can be zoomed in/out by intuitive gesture operations such as tapping and pinching.

The problem is, however, that where an image is zoomed in on the basis of a gesture operation, the magnification should be adequately set. Where the magnification is not set adequately, the user should perform a number of zooming operations to obtain the desired magnification. Accordingly, a large number of techniques for estimating the zooming magnification desired by the user have been devised.

For example, the image display program disclosed in Japanese Patent Application Publication No. 2006-178222 detects human faces included in the image and zooms in the human face which is the nearest to the position designated by the user. Further, in the electronic album disclosed in Japanese Patent Application Publication No. 2004-193933, a plurality of faces present in an image are detected and the image is zoomed in at a magnification such that none of the faces is framed out.

SUMMARY OF THE INVENTION

With the invention disclosed in Japanese Patent Application Publication No. 2006-178222, the object (face) which the user is estimated to be wishing to zoom in is determined and the zooming magnification is determined such that the object is not framed out.

However, in this invention, where a random object is designated this object can be zoomed in, but a plurality of objects cannot be designated. For example, when two people are photographed side by side, the screen can be filled by zooming in either face, but the invention cannot be adapted to a case in which it is desirable to zoom in both faces to fill the screen.

Meanwhile, with the invention disclosed in Japanese Patent Application Publication No. 2004-193933, where a plurality of people is included in an image, the image can be zoomed in to fit the faces of all of the people into the screen. However, since the processing in the invention is performed by taking all of the captured faces as objects, it is impossible to zoom in only the faces of some of the people.

Thus, there are cases in which none of the aforementioned inventions can accurately zoom in the range which the user desires.

With the foregoing in view, it is an objective of the present invention to provide a technique for estimating accurately the range which the user desires to zoom in an image display apparatus having an image zooming function.

In order to attain this objective, the present invention provides an image display apparatus including: a display screen; an image output unit configured to output an image to the display screen; a region setting unit configured to extract one or more objects included in the image and to set a first region, which is a region corresponding to each of the objects; an operation acquisition unit configured to acquire a coordinate on the display screen that has been designated by a user; and an image zooming unit configured to zoom in the image, which is being displayed, on the basis of the designated coordinate, wherein the image zooming unit zooms in the object included in the first region when the designated coordinate is within the first region.

The first region is a region corresponding to the object included in the image. The object is one or more objects included in the image. For example, when the image is a photograph, the object may be a human face or the entire human body including the face. For example, the first region may be a rectangle circumscribing the object or a closed region representing the contour of the object. Where a plurality of objects is included in the image, a plurality of first regions is set by the region setting unit.

The operation acquisition unit is a unit for acquiring the coordinate on the display screen that has been designated by the user. The coordinate on the screen may be designated by any means. For example, an input device such as a mouse may be used or a touch panel may be used.

The image zooming unit zooms in the object, which is included in the first region, as a target when the designated coordinate is in the first region. For example, a magnification is determined such that the object fills the screen and the object is zoomed in.

The region setting unit may further set a second region, which is a region including the first region and is wider than the first region, and the image zooming unit may zoom in an object located in a predetermined range with respect to the designated coordinate when the designated coordinate is outside the first region and within the second region.

The second region is a region that includes the first region and is wider than the first region. Where the user designates a location outside the first region, but inside the second region, the user can be estimated to be trying to zoom in not only the object included in the first region, but also the object close to the coordinate. Accordingly, one or more objects located in a predetermined range with respect to the designated coordinate are extracted and the extracted objects are taken as a zooming target. The predetermined range, as referred to herein, may be within a predetermined distance or within a range of a graphic of a predetermined size.

The image zooming unit may zoom in the image by using a predetermined magnification when the designated coordinate belongs to neither the first region nor the second region.

Where a location is designated which is not included in the first region or second region, the user can be estimated to be trying to perform the zooming without specifically designating an object. In such a case, it is preferred that the image be zoomed in by using a predetermined magnification.

The image zooming unit may determine a magnification such that an object, which is a zooming target, does not depart from the display screen when the object is zoomed in, and may zoom in an image by using the magnification.

More specifically, for example, the magnification may be determined such that the first region corresponding to the object does not depart from the display screen, or the object contour may be detected and the magnification may be determined such that the contour does not depart from the display screen.

Further, the image zooming unit may determine a post-zooming center coordinate such that a center of the object, which is a zooming target, becomes a center of the display screen when the object is zoomed in. The image zooming unit may also determine a post-zooming center coordinate such that the designated coordinate becomes a center of the display screen when the object is zoomed in.

In such a way, the object which the user desires to zoom in can be zoomed in naturally. Where a plurality of objects which are the zooming targets is present, a midpoint of the plurality of objects may be the center of the display screen.

The display screen and the operation acquisition unit may be constituted by a touch panel display, and the object to be extracted by the region setting unit may be a human face.

The image display apparatus in accordance with the present invention can be advantageously used in an apparatus provided with a touch panel display and also can be advantageously used in an apparatus that displays photos including a human face.

The present invention can be specified as an image display apparatus including at least some of the abovementioned units. The present invention can be also specified as an image display method. Furthermore, the present invention can be specified as a program that executes the image display method with a computer. The abovementioned processing or units can be executed in any combination, provided that they do not technically contradict each other.

With the present invention, it is possible to estimate accurately the range which the user desires to zoom in an image display apparatus having an image zooming function.

DESCRIPTION OF THE EMBODIMENTS (System Configuration)

The preferred embodiment of the present invention will be explained hereinbelow with reference to the drawings.

Figure 1:
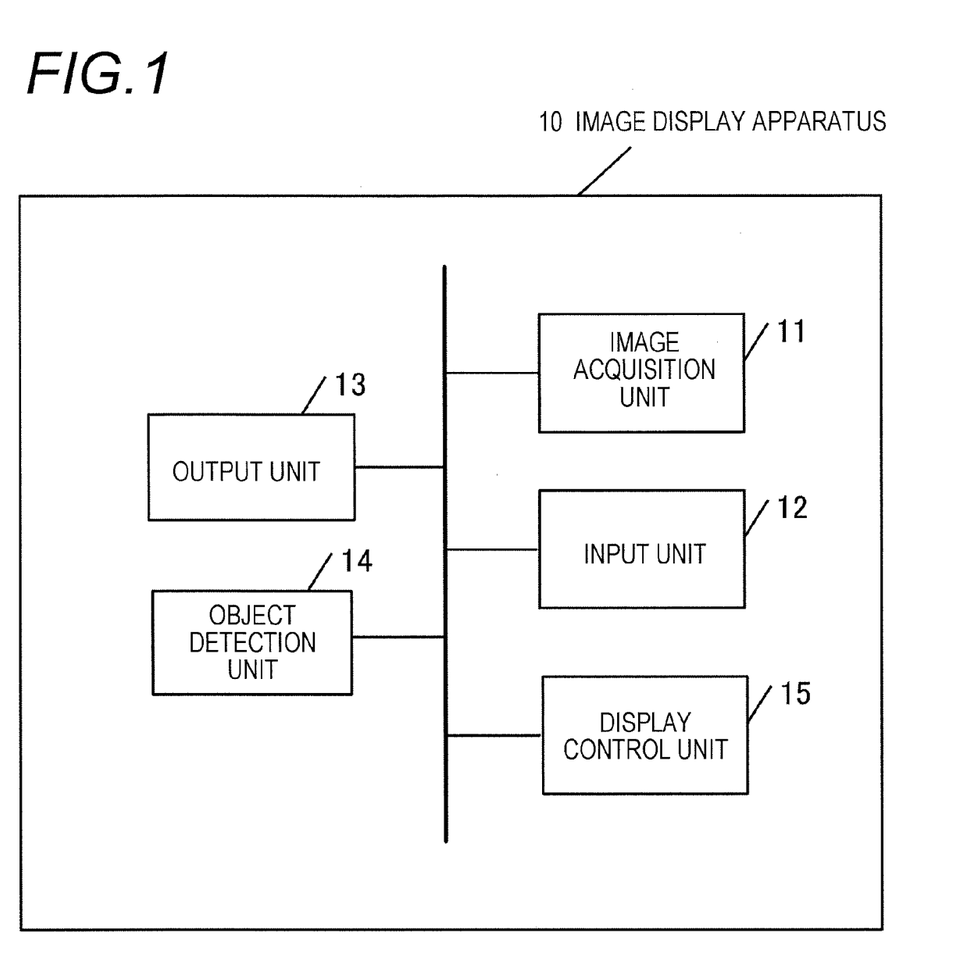
FIG. 1 is a system configuration diagram of an image display apparatus according to an embodiment.

The image display apparatus according to the present embodiment is a tablet-type computer having a function of outputting an image such as a graphic or a photograph to an incorporated touch panel display. Further, the image display apparatus according to the present embodiment can zoom in/out the image, which is being displayed, on the basis of an operation performed by a user. FIG. 1 is a system configuration diagram of an image display apparatus 10 according to the present embodiment.

The image display apparatus 10 is constituted by an image acquisition unit 11, an input unit 12, an output unit 13, an object detection unit 14, and a display control unit 15. In the image display apparatus 10, a program stored in an auxiliary storage device is loaded into a main storage device and executed by a CPU, thereby actuating various units depicted in FIG. 1 (the CPU, auxiliary storage device, and main storage device are not shown in the figure).

The image acquisition unit 11 is a unit for acquiring an image to be displayed. In the present embodiment, the image acquisition unit is a storage device such as a fixed disk drive or a flash memory. The image acquisition unit 11 may be a unit (for example, a communication device) for acquiring an image from outside of the apparatus.

The input unit 12 is a unit for receiving an input operation performed by the user. More specifically, the input unit is constituted by a touch panel and a controller therefor. The input unit 12 can detect the contact of a finger with the touch panel and acquire the input operation performed by the user.

Further, the output unit 13 is a unit for presenting information to the user. More specifically, the output unit is constituted by a liquid crystal display and a controller therefor and is a unit for generating a graphic to be presented to the user and displaying the graphic on the display.

In the present embodiment, the touch panel constituting the input unit 12 and the liquid crystal display constituting the output unit 13 are constituted by a single touch panel display (touch screen).

The object detection unit 14 is a unit for detecting an object to be included in the image. The object is typically a human body or a human face, but any object may be considered, provided that the region in which the object is present can be specified. For example, where the image is a map of Japan, each prefecture may be an object. Where the image is a dynamic image picked up by a camera monitoring a road, a vehicle may be an object. In the explanation of the present embodiment, the object is a human face.

The display control unit 15 is a unit for controlling the screen display. More specifically, the display control unit executes the processing of acquiring the operation performed by the user through the input unit 12, the processing of acquiring the image through the image acquisition unit 11 and presenting the acquired image to the user through the output unit 13, and the processing of zooming in/out the image, which is being displayed, on the basis of the operation performed by the user. The detailed method of the processing is explained hereinbelow.

(Summary of Image Display Processing)

Figure 2:
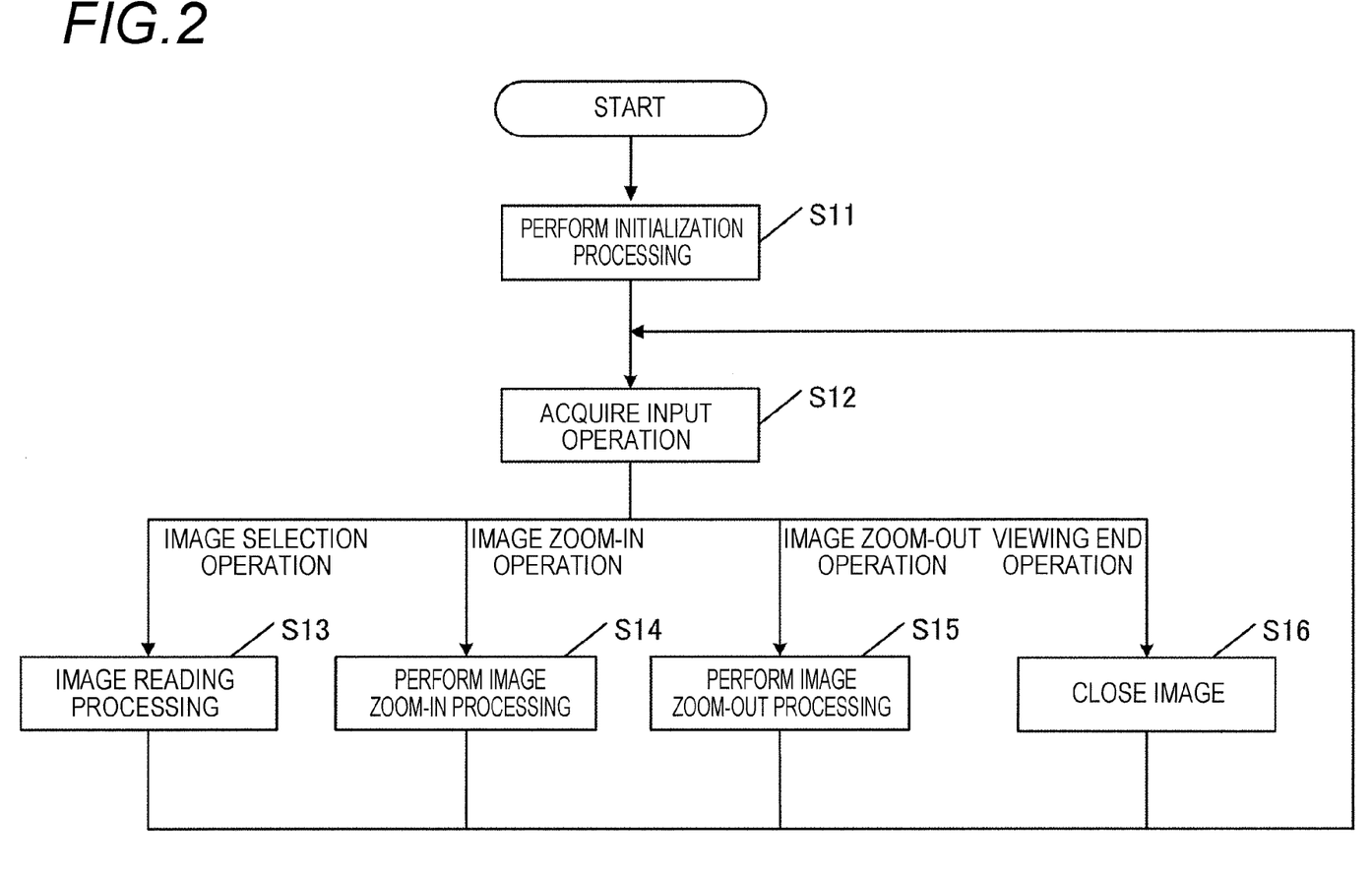
FIG. 2 is a processing flowchart of the image display apparatus according to the embodiment.

The image display processing performed by the image display apparatus 10 is explained hereinbelow with reference to the processing flowchart. FIG. 2 is a flowchart of the image display processing performed by the image display apparatus 10. The processing depicted in FIG. 2 begins when the image display apparatus 10 is activated.

Step S11 is a step for initializing the image display apparatus 10. More specifically, the CPU reads the program from the auxiliary storage device and expands and runs the program in the main storage device. Where the program is executed, the display control unit 15 generates a screen for operation and displays the screen on the touch screen through the output unit 13.

Figure 3A:
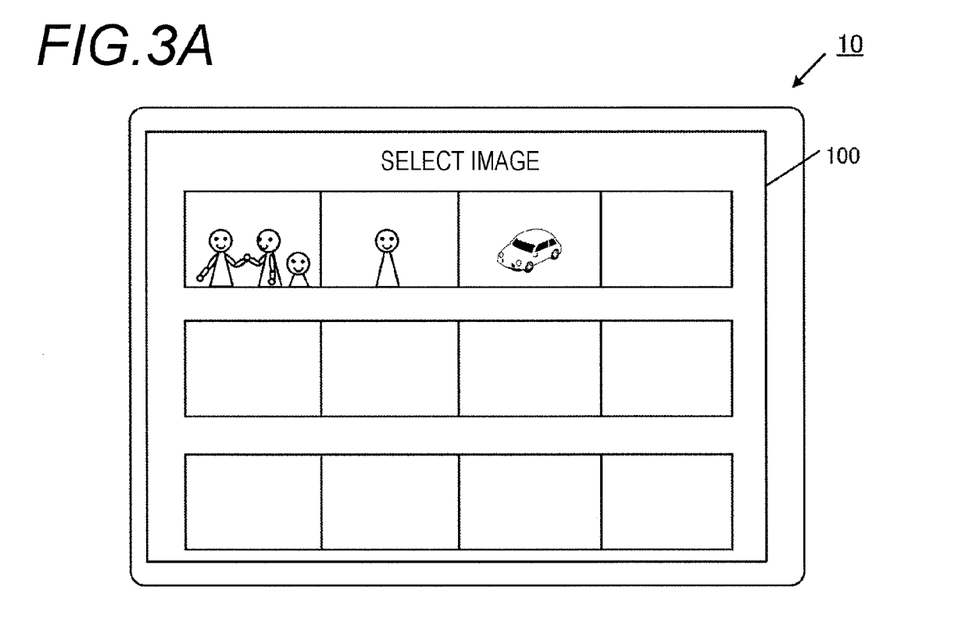
FIG. 3A and FIG. 3B illustrate the screen displayed in the image display apparatus.
Figure 3B:
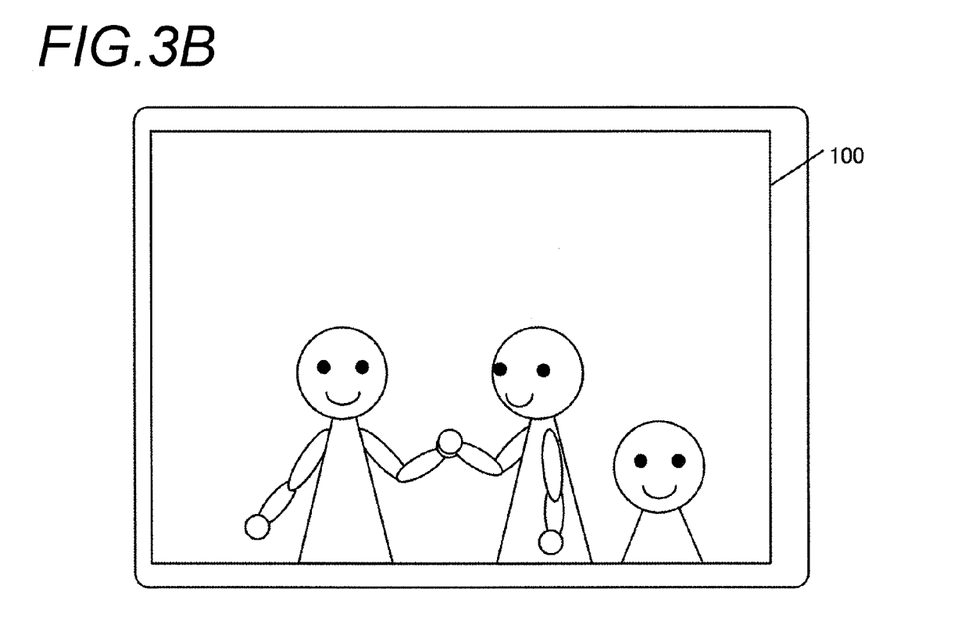

The screen to be displayed on the image display apparatus is explained below. FIG. 3A and FIG. 3B represent the image display apparatus 10, and the reference numeral 100 stands for a touch screen. The display control unit 15 can display a graphic on the screen through the output unit 13.

The display control unit 15 can also switch the screen between two display modes. The first is the screen (image selection screen) for selecting an image to be viewed, such as depicted in FIG. 3A, and the second is a screen (image viewing screen) for displaying the selected image, such as depicted in FIG. 3B. Where step S11 is executed, the display control unit 15 initially generates and outputs the image selection screen. In the image selection screen, a plurality of images stored in the image acquisition unit 11 is displayed in a thumbnail format.

In step S12, the display control unit 15 acquires the input operation performed on the touch panel through the input unit 12. Examples of the input operation that can be performed on the touch panel include the four operations, namely, an image selection operation, an image zoom-in operation, and image zoom-out operation, and a viewing end operation. Each of those operations will be briefly explained below. The explanation of other operations in the present embodiment is omitted.

The image selection operation is an operation of selecting the image which the user desires to view. The image selection operation is effective only on the image selection screen. Where the user performs the operation of selecting one of the thumbnails which are being displayed (for example, a tap operation, or a double tap operation), the display control unit 15 reads the corresponding image and displays the image on the image viewing screen. The processing step corresponding to this operation is step S13.

The image zoom-in operation is an operation of increasing the display magnification of the image which is being displayed. The image zoom-in operation is effective only on the image viewing screen. Where the user designates any position of the image, which is being displayed, by a tap operation, or the like, the display control unit 15 calculates a zoom-in magnification and a post-zoom-in center coordinate on the basis of the designated position and zooms in the image. The processing step corresponding to the present operation is step S14.

The image zoom-out operation is an operation of decreasing the display magnification of the image which is being displayed. The image zoom-out operation is effective only on the image viewing screen. Where the user designates any position of the image, which is being displayed, by a tap operation, or the like, the display control unit 15 calculates a zoom-out magnification and a post-zoom-out center coordinate on the basis of the designated position and zooms out the image. The processing step corresponding to the present operation is step S15.

The viewing end operation is an operation of closing the image which is being displayed. The viewing end operation is effective only on the image viewing screen. Where the user performs the operation of closing the image which is being displayed, the display control unit 15 discards the image which is being displayed and redisplays the image selection screen. The processing step corresponding to the present operation is step S16.

(Details of Image Display Processing)

The processing performed in steps S13, S14, S15, and S16 is explained hereinbelow in greater detail.

In step S13, the display control unit 15 reads the selected image and displays the image on the image viewing screen. Where the operation acquired in step S12 is the image selection operation, the processing advances to step S13.

Figure 4:
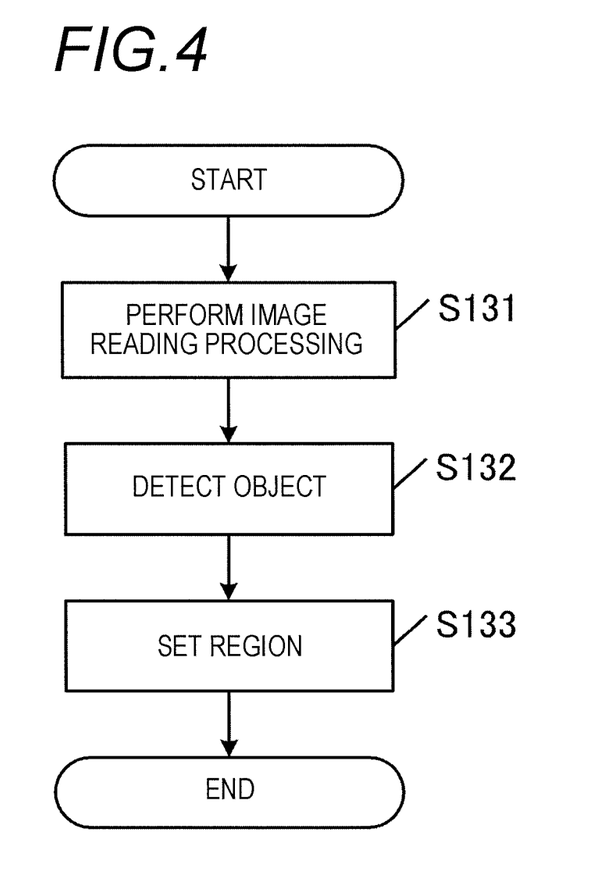
FIG. 4 is a flowchart of image read processing.

FIG. 4 is a flowchart illustrating in detail the contents of the processing performed in step S13.

Initially, in step S131, the designated image is read from the image acquisition unit 11 and decoded. In this case, it is estimated that the image depicted in FIG. 3B is read.

In step S132, the object detection unit 14 detects an object from the acquired image. As mentioned hereinabove, in the present embodiment, the object is a human face. In the case depicted in FIG. 3B, faces of three people are detected as objects. Since a well-known method can be used for detecting a face included in an image, the detailed explanation thereof is herein omitted.

In step S133, a region corresponding to the detected object is set. In the present embodiment, a first region which is a region corresponding to the detected object and a second region which is larger than the first region are set.

Figure 5:
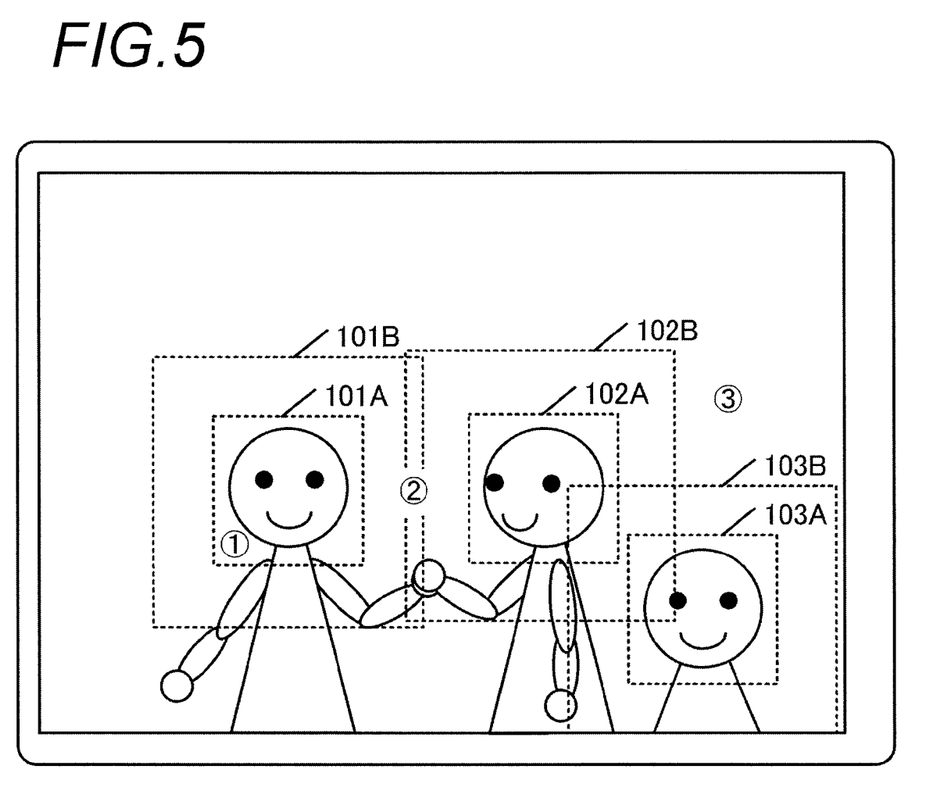
FIG. 5 illustrates arrangement locations of the first region and second region.

A method for setting the first region and the second region is explained hereinbelow with reference to FIG. 5. FIG. 5 represents the results obtained when an object (that is, a human face) is detected using the image depicted in FIG. 3B and the first region and second region are set.

The first region is a rectangular region circumscribing the detected object. In the example depicted in FIG. 5, regions 101A, 102A, and 103A, which are the regions circumscribing the three human faces, are set as the first regions.

The second region has an area which is larger than that of the first region by a predetermined factor. The central point of the second region is the central point of the first region. In the example depicted in FIG. 5, regions 101B, 102B, and 103B are set as second regions. The second region can have any size, provided that it is larger than the size of the first region. For example, the second region may be larger than the first region by a predetermined number of pixels in the vertical and horizontal directions.

Information relating to the first region and second region is held by the display control unit 15 till the viewing end operation relating to the image which is being displayed is performed.

The processing performed in steps S14 is explained hereinbelow in greater detail.

In step S14, the display control unit 15 zooms in the image that is being displayed. When the operation acquired in step S12 is that of zooming the image, the processing advances to step S14. The operation of zooming the image, as referred to in the present embodiment, is an operation of tapping any location in the image which is performed by the user.

Figure 6:
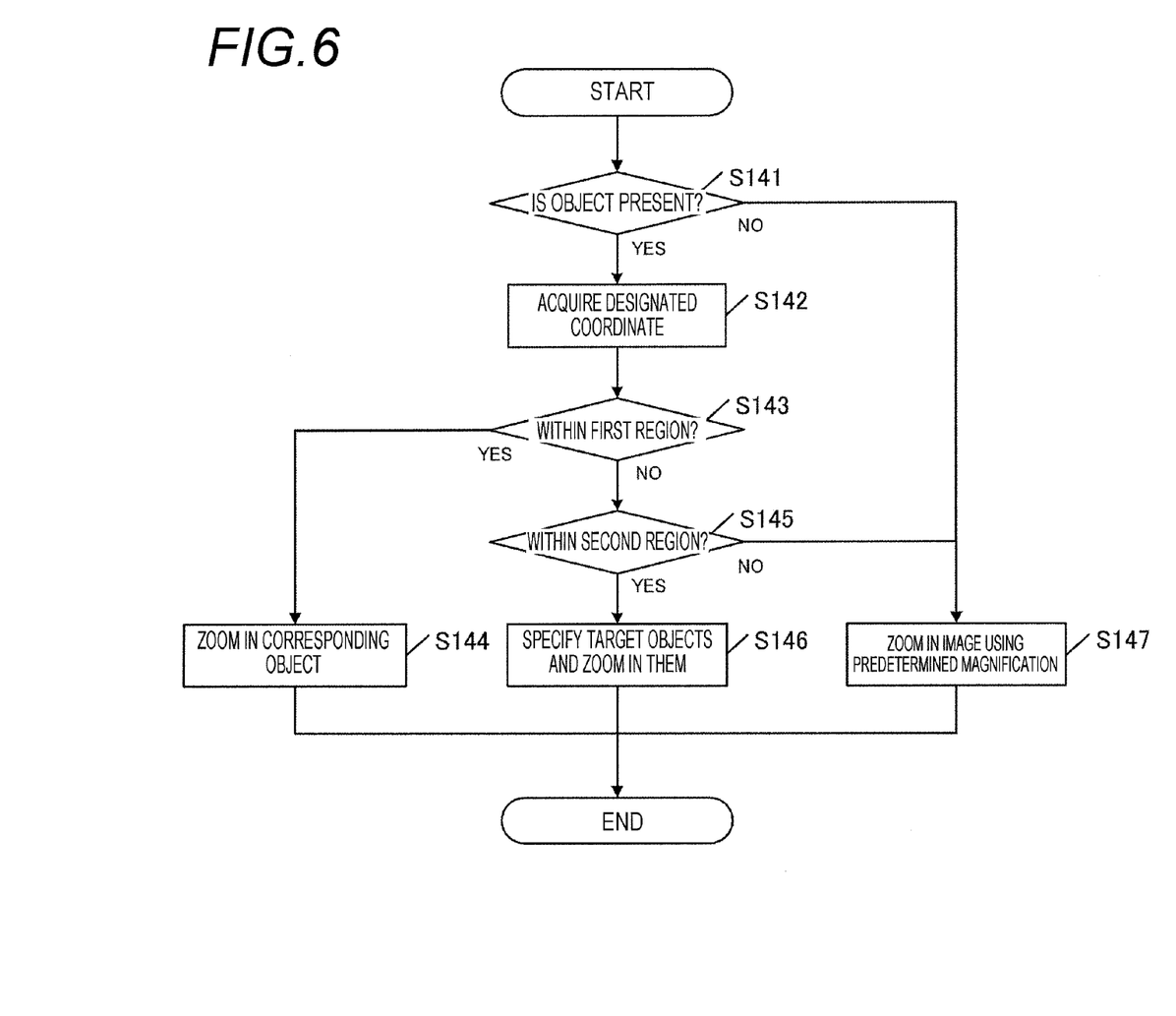
FIG. 6 is a flowchart of image zooming processing.

FIG. 6 is a flowchart illustrating in detail the contents of the processing performed in step S14.

Initially, in step S141, it is determined whether one or more objects are included in the image which is being displayed. Where it is determined that no object is included, the processing advances to step S147, and the zooming is performed using a default magnification. When an object is included in the image which is being displayed, the processing advances to step S142, and the coordinate designated (that is, tapped) by the user is acquired.

In the processing of step S142 and subsequent steps, the zooming processing is performed differently with respect to each of the following three patterns in which the location tapped by the user is "within the first region", "outside the first region, but within the second region", and "outside the second region". Each of the patterns is described below in greater detail.

(1) Interior of the First Region is Tapped

Initially, in step S143, it is determined whether or not the location tapped by the user is within the first region. Where the result indicates that the tapped location is within the first region (S143—Yes), the processing advances to step S144, and the corresponding object is zoomed in.

Where the location tapped by the user is within the first region, the user can be estimated to be trying to zoom in the object corresponding to the first region. For example, where the tapped location is represented by the reference numeral 1 in the circle in FIG. 5, the user can be estimated to be trying to zoom in the face of the person shown on the left side of the screen.

Figure 7:
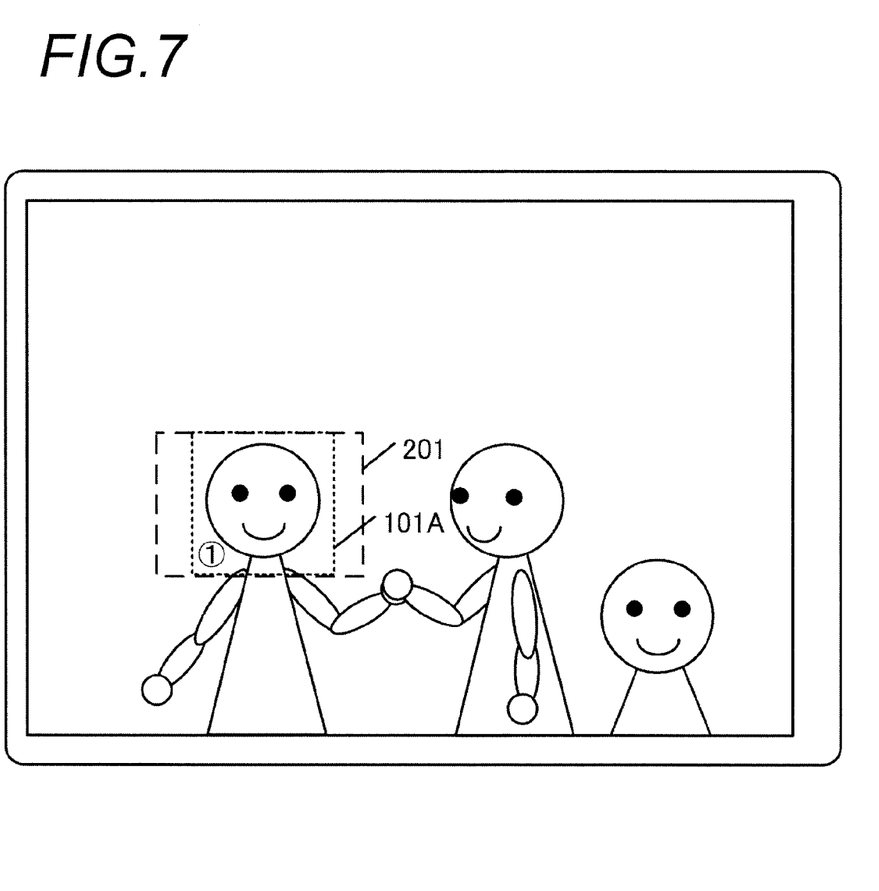
FIG. 7 illustrates a range which is zoomed in on the basis of a user's operation.

FIG. 7 illustrates the zooming range when the first region is designated.

In step S144, the corresponding target human face is zoomed in. More specifically, the maximum magnification at which a region 101A does not depart from the screen is determined, and the center of the post-zoom-in screen is set to the central point of the region 101A. As a result, a region

201 indicted by a dot line is zoomed in to fill the screen. Where the zooming of the image is ended, the processing advances to step S12 and waits for the input.

In the present example, the case is explained in which the interior of the region 101A is designated, but the same processing is performed even when the interior of the regions 102A and 103A is designated.

(2) Tapped Location is Outside the First Region, but Inside the Second Region

Where the location tapped by the user is outside the first region (S143—No), it is determined in step S145 whether the location is within the second region. Where it is determined that the location is within the second region (S145—Yes), the processing advances to step S146, one or more objects which are the targets of zooming are determined, and the objects are then zoomed in.

The processing of step S146 is explained hereinbelow in greater detail.

Where the location tapped by the user is outside the first region and within the second region, the user can be estimated to be trying to zoom in not only the object included in the first region, but also an object close to this coordinate. For example, where the tapped location is represented by the reference numeral 2 in the circle in FIG. 5, the user can be estimated to be trying to zoom in the faces of two persons shown in the center of the screen.

Figure 8:
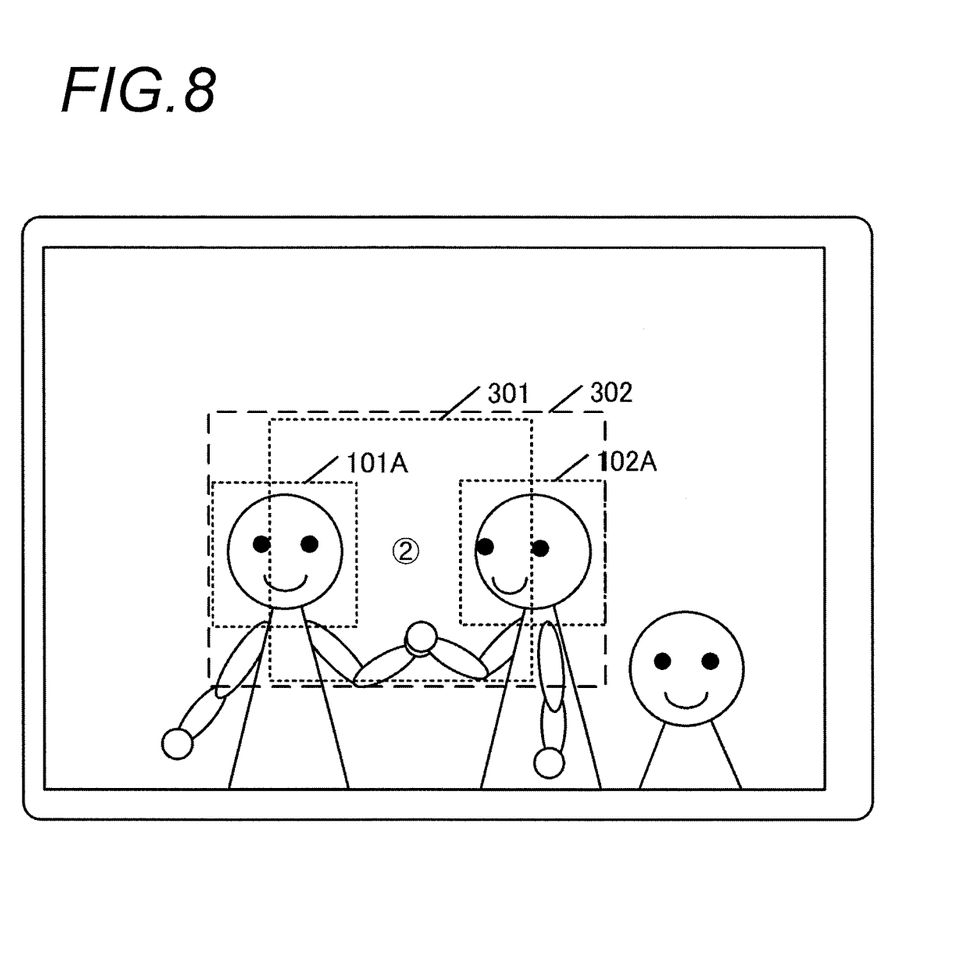
FIG. 8 is the second drawing illustrating a range which is zoomed in on the basis of a user's operation.

FIG. 8 illustrates the zooming range when a location which is outside the first region, but within the second region is designated. In step S146, the object which is the target of zooming is specified by the following processing.

(2-1) Third Region Centered on the Coordinate Designated by the User is Set

The third region is a region for specifying the object which is the target of zooming. In the present embodiment, the third region is "a rectangular region having a predetermined size and centered on the designated coordinate". In the present example, a region 301 is set as the third region.

(2-2) Object Included in the Third Region is Extracted

An object (first region) which is partially or entirely included in the third region is extracted. In the present example, the regions 101A and 102A are extracted.

(2-3) Extracted Object is Zoomed in as Target

A maximum magnification at which the extracted regions 101A and 102A do not depart together from the screen is determined, and the center of the post-zoom-in screen is set to the midpoint of the regions 101A and 102A. As a result, the region 302 depicted by the dot line is zoomed in to fill the screen.

Where the zooming of the image is ended, the processing advances to step S12 and waits for the input.

In the present example, the rectangular region centered on the designated coordinate is set as the third region, and the third region is not necessarily rectangular. For example, the third region may be a circle centered on the designated coordinate or a region having another shape.

Further, a method other than that explained by way of example may be used, provided that an object located in a predetermined range with respect to the designated coordinate can be extracted. For example, when the designated coordinate is included in a plurality of second regions, all of the objects corresponding to the plurality of second regions may be zoomed in. In the example depicted in FIG. 5, the designated coordinate is inside both the region 101B and the region 102B. Therefore, it may be determined that the two faces included in the regions 101B and 102B are to be taken as the zooming targets.

(3) Location Outside the Second Region is Tapped

Where the location tapped by the user does not belong to the second region (S145—No), the processing advances to step S147. In this case, the user can be estimated not to be trying to zoom in a specific object. Therefore, in step S147, the zooming is performed using the default magnification.

The processing performed in step S15 and step S16 is explained hereinbelow in greater detail.

In step S15, the image which is being displayed is zoomed out. When the operation acquired in step S12 is that of zooming out the image, the processing advances to step S15. The operation of zooming out the image, as referred to in the present embodiment, is an operation of double-tapping any location in the image which is performed by the user. When such an operation is present, the display control unit 15 zooms out the image, which is being displayed, at a predetermined magnification. The magnification in image zoom-out may be a fixed value or may be determined on the basis of the magnification in image zoom-in in step S14.

In step S16, the image which is being displayed is closed. Where the operation acquired in step S12 is that of closing the image, the display control unit 15 closes the image viewing screen and displays again the image selection screen.

As described hereinabove, in the image display apparatus according to the present embodiment, when an image is loaded, a first region and a second region are set and the logic of determining an object which is the target of zooming is changed depending on whether the location (coordinate) designated by the user is within the regions. In such a way, the object which the user desires to zoom in can be accurately estimated. Thus, the desired zooming magnification can be obtained with a single operation.

(Variation Example)

The above-described embodiment is but an example, and the present invention can be implemented by making changes, as appropriate, without departing from the essence thereof.

For example, in the explanation of the embodiment, the rectangular region circumscribing the detected object is taken as the first region, but the first region is not necessarily rectangular. For example, an object edge may be detected and a closed region along the edge may be set.

Further, the user may designate the coordinate by an operation other than tapping.

In the explanation of the embodiment, the maximum magnification at which the first region corresponding to the object does not depart from the screen is determined when the target object is zoomed in, but the zooming magnification may be adequately set within a range in which the visibility is not impaired. For example, the n percentage of the maximum magnification may be used. Further, the object contour may be extracted without using the first region, and the magnification may be determined such that the contour does not depart from the display screen.

Further, the center coordinate after the object has been zoomed in may be the coordinate designated by the user.

In the embodiment, an example is explained in which an object is extracted from an image, but where the location where an object is present can be held by metadata or the like, the object location may be acquired using the data, without detecting the object.

In the embodiment, an example is explained in which a stationary image is displayed, but the present invention can be also used in a device displaying dynamic images. For example, when an operation of zooming in an image is performed when a dynamic image is reproduced, the above-described processing may be performed using an image corresponding to the frame which is being reproduced, and the dynamic image which is being reproduced may be zoomed in.

CROSS REFERENCE TO RELATED APPLICATION

This application claims the benefit of Japanese Patent Application No. 2014-47341, filed on Mar. 11, 2014, which is hereby incorporated by reference herein in its entirety.

What is claimed is:

1. An image display apparatus comprising:
a display screen;
an image output unit configured to output an image to the display screen;
a region setting unit configured to extract one or more objects included in the image, to set a first region, which is a region corresponding to each of the objects, and to set a second region, which is a region corresponding to each of the objects, is a region including the first region and is wider than thq first region;
an operation acquisition unit configured to acquire a coordinate on the display screen that has been designated by a user; and
an image zooming unit configured to zoom in the image, which is being displayed, on the basis of the designated coordinate, wherein
when the designated coordinate is within the first region, the image zooming unit zooms in the object corresponding to the first region,
when the designated coordinate is not within the first region and is within a plurality of the second region corresponding to a plurality of the objects respectively, the image zooming unit zooms in the plurality of objects.

2. The image display apparatus according to claim 1, wherein
the image zooming unit zooms in the image by using a predetermined magnification when the designated coordinate belongs to neither the first region nor the second region.

3. The image display apparatus according to claim 1, wherein
the image zooming unit determines a magnification such that an object(s), which is a zooming target, does not depart from the display screen when the object(s) is/are zoomed in, and zooms in the image by using the magnification.

4. The image display apparatus according to claim 3, wherein
the image zooming unit determines a post-zooming center coordinate such that a center of the object(s), which is a zooming target, becomes a center of the display screen when the object(s) is/are zoomed in.

5. The image display apparatus according to claim 3, wherein
the image zooming unit determines a post-zooming center coordinate such that the designated coordinate becomes a center of the display screen when the object(s) is/are zoomed in.

6. The image display apparatus according to claim 1, wherein
the display screen and the operation acquisition unit are constituted by a touch panel display.

7. The image display apparatus according to claim 1, wherein
the object(s) to be extracted by the region setting unit is/are (a) human face(s).

8. An image display method performed by an image display apparatus having a display screen, the image display method comprising:
outputting an image to the display screen;
extracting one or more objects included in the image, setting a first region, which is a region including each of the objects, and setting a second region, which is a region corresponding to each of the objects, the second region is a region including the first region and is wider than the first region;
acquiring a coordinate on the display screen that has been designated by a user; and
zooming in the image, which is being displayed, on the basis of the designated coordinate, wherein
in the step of zooming in the image,
when the designated coordinate is within the first region, the object corresponding to the first region is zoomed in, and
when the designated coordinate is not within the first region and is within a plurality of the second region corresponding to a plurality of the objects respectively, the plurality of objects is zoomed in.

9. A storage medium that non-transitory stores an image display program executed by a computer that acquires an input from an input unit and outputs an image to a display screen, the image display program comprising:
outputting an image to the display screen;
extracting one or more objects included in the image, setting a first region, which is a region including each of the objects, and setting a second region, which is a region corresponding to each of the objects, the second region is a region including the first region and is wider than the first region;
acquiring a coordinate on the display screen that has been designated by a user via input means; and
zooming in the image, which is being displayed, on the basis of the designated coordinate, wherein
in the step of zooming in the image,
when the designated coordinate is within the first region, the object corresponding to the first region is zoomed in, and
when the designated coordinate is not within the first region and is within a plurality of the second region corresponding to a plurality of the objects respectively, the plurality of objects is zoomed in.

* * * * *